Figure 1:
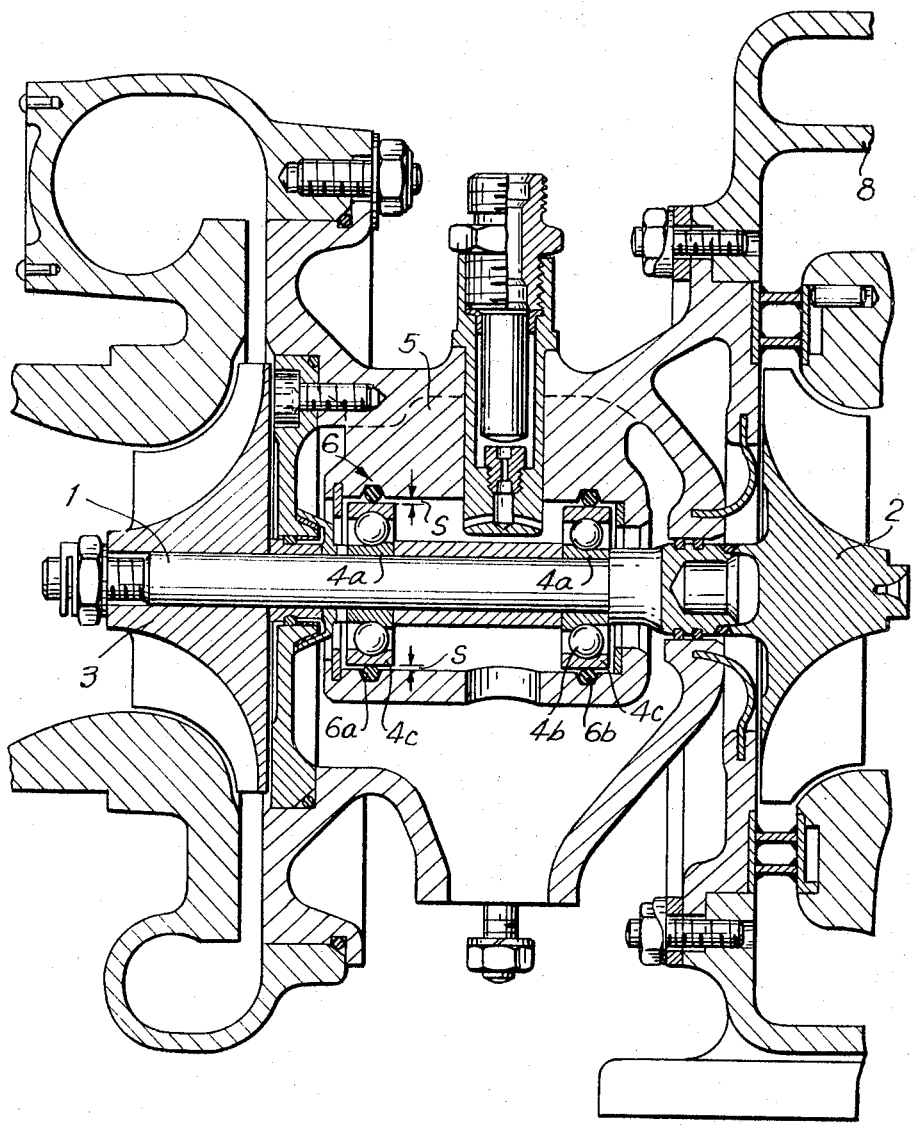

Feb. 21, 1967  S. KOFINK  3,304,802
RESILIENT BEARING SUPPORT MEANS FOR ROTATABLE SHAFT
Filed June 8, 1964  2 Sheets-Sheet 1

INVENTOR.
SIEGFRIED KOFINK
BY
McGlew & Toren
ATTORNEYS 3,304,802
RESILIENT BEARING SUPPORT MEANS FOR
ROTATABLE SHAFT
Siegfried Kofink, Zell (Neckar), Germany, assignor to Geratebau Eberspacher OHG, Esslingen (Neckar), Germany
Filed June 8, 1964, Ser. No. 373,444
Claims priority, application Germany, June 26, 1963, G 38,035
12 Claims. (Cl. 74—573)

This invention relates to rotatable shaft assemblies and, more particularly, to a novel resilient support for bearings rotatably supporting a shaft, which resilient support permits a limited amount of play in the shaft about its centroidal axis to accommodate any unbalance in the load on the shaft and to eliminate the effects of such unbalance.

In a rotatable shaft assembly, such as, for example, the support assembly for the shaft of a runner or rotor of a turbine, pump or the like, the problem of obtaining dynamic balance under all load conditions has been a very difficult one to solve. Despite careful design considerations and careful assembly of a shaft supporting a high speed rotor or runner, there are certain load conditions, within the load range over which the device is to operate, under which off-center or eccentric loading will be imparted to the support shaft. This is particularly the case with high speed rotary machines such as turbines, and, for example, particularly waste gas turbines driving a rotating load. While adequate provision can be made for absorbing the normal radial and axial loading on the shaft, load variations will quite frequently result in eccentric dynamic loading of the shaft.

Various arrangements have been proposed to accommodate or compensate dynamic unbalance in rotating shaft assemblies. Generally, these solutions have involved the use of resilient support means interposed between the shaft bearings and the bearing housing, resilient means of various types being used. One known solution comprises the use of several metal rings or plates having junctions staggered relative to each other and with oil under pressure being introduced between the rings or plates to dampen shaft vibrations. Another solution has been to use resilient sleeves or the like interposed between the shaft bearings and the bearing housing. It has also been proposed to use a spirally wound band interposed between the shaft bearings and the bearing housing.

All of these solutions have the common disadvantage that they amount, in effect, to an axially elongated sleeve surrounding the bearing of the shaft. Consequently, the known arrangements do not permit any adjustment or play of the shaft about its centroidal axis and, to this extent, the known arrangements are the equivalent of rigid supports providing little play for the shaft. In such known arrangements of resilient intermediate members between the shaft bearings and the bearing housings, the direction of action of the intermediate member depends upon whether the bearing is a radial bearing, an axial or a thrust bearing, or a bearing designed to accommodate both radial and axial thrusts. However, as stated, known arrangements do not permit play of the shaft about its centroidal axis.

An object of the present invention is to provide an improved support arrangement for a rotatable shaft permitting a limited freedom of movement of the shaft about its centroidal axis.

Another object of the invention is to provide an improved support assembly for a rotatable shaft including resilient or elastic support means interposed between the shaft bearings and the bearing housing, and which will permit a limited degree of play of the shaft about its centroidal axis due to eccentric dynamic loading of the shaft.

A further object of the invention is to provide a novel rotatable shaft assembly including support means which act not only to absorb the main radial and axial loads, but also provide for a limited degree of movement of the shaft about its centroidal axis.

Yet another object of the invention is to provide a rotatable shaft assembly including resilient means interposed between the shaft bearings and the housing for the latter, and which will accommodate radial and/or axial loading of the shaft as well as compensating for dynamic unbalance of the shaft under varying load conditions.

In accordance with the invention, the foregoing objects are obtained by providing at least one intermediate member, preferably resilient or elastic, interposed between a shaft bearing and a bearing housing and preferably centered axially with respect to the bearing. Such intermediate member preferably has a circular cross section, or a curvilinear cross section, and is preferably seated within an annular groove in the bearing housing. The provision of an intermediate resilient member of the type just mentioned, permits wobbling movements of the shaft or adjustment of the latter about its centroidal axis to accommodate any dynamic unbalance with variations in load. Furthermore, the invention arrangement results in a progressively increasing spring effect with such wobbling movements on the shaft.

In another embodiment of the invention, two spaced circular rings, such as O-rings, embrace each shaft bearing and are positioned equidistant from the center of the bearing measured axially of the latter. These two rings define betwen them a sealed space which constitutes a damping chamber into which oil under pressure can be introduced to augment the damping of the shaft movement, particularly under unbalanced loading thereof. This damping arrangement is particularly effective because the oil cushion, due to the effective sealing of the damping chamber, is provided even at relatively low oil pressures.

For an understanding of the principles of the invention, reference is made to the following description of typical embodiments thereof as illustrated in the accompanying drawings.

Figure 2:
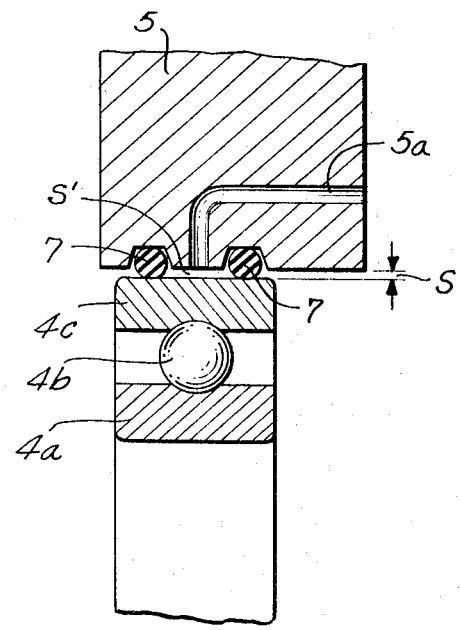

In the drawings:

FIG. 1 is an axial sectional view through the rotor or runner support shaft of a waste gas turbine, and having the bearing support means of the invention incorporated therein; and FIG. 2 is a partial axial sectional view of a bearing support arrangement, illustrating another embodiment of the invention.

Referring first to the embodiment of the invention illustrated in FIG. 1, a rotatably supported shaft 1 has secured to rotate therewith rotors or runners 2 and 3. One of the runners 2 and 3 may be, for example, the rotor of the turbine and the other may be, for example, a rotor or a pump or the like. In the illustrated embodiment, shaft 1 is rotatably supported by means of a pair of antifriction bearing assemblies each including an inner race 4a, balls 4b, and an outer race 4c. However, it should be understood that the illustrated antifriction bearing assemblies are exemplary only and that other types of bearings, whether antifriction bearings or not, may be used.

The bearing assemblies are supported within a housing generally indicated at 5, and it will be noted that there is a substantial radial gap S between the outer surface of each outer race 4c and the inner surface of the housing 5.

The inner surface of housing 5 is formed with a pair of annular grooves 6, each centered with respect to one of the bearing assemblies for shaft 1. The annular grooves 6 may have any desired cross section and, as illustrated, the cross section is essentially trapezoidal. Grooves 6 serve to seat resilient rings, such as O-rings, 6a and 6b which preferably have sufficient resiliency that they may be stretched to slip over the outer races 4c of the bearing assemblies and to snugly embrace these outer races. While rings 6a and 6b are illustrated as circular in cross section, which is preferred, the essential feature of these rings is that they be made of elastic material and be relatively narrow in an axial direction.

The rings 6a and 6b permit shaft 1 to wobble or tilt about its centroidal axis when the dynamic loading on the shaft becomes unbalanced. At the same time, the rings 6a and 6b absorb the radial loading on the shaft, and furthermore act to absorb the axial loading on the shaft due to their confinement within the grooves 6.

Referring to FIG. 2, in the embodiment of the invention illustrated therein, the bearing assembly again includes an inner race 4a, balls 4b and an outer race 4c. The bearing housing 5, in this case, is formed with a pair of annular grooves which are spaced equal axial distances to either side of the central diametric plane of the bearing assembly. Each of these two grooves serves to seat a resilient or elastic ring 7 which has a snug fit on the outer race 4c of the bearing assembly. Rings 7, in addition to acting to absorb radial and axial stresses on the shaft, as well as serving to permit wobbling of the shaft when there is dynamic unbalance in the loading thereof, also serve as seals to define a damping chamber S'.

This chamber S' forms a portion of the radial gap S between the inner surface of housing 5 and the outer surface of outer race 4c. Housing 5 is formed with a bore 5a in communication with the sealed damping space S'. Groove 5a is supplied with oil under pressure as, for example, by being connected to the lubricating system of a rotatable load connected to the shaft supported in the bearing assembly. The oil thus introduced under pressure into gap section S' provides additional damping for the shaft due to the shock absorbing qualities of the oil.

In both embodiments of the invention, the rotating shaft has a limited degree of freedom to wobble due to the line contact of the O-rings 6a, 6b and 7 with the bearing assemblies and with the bearing assembly housing. Such wobble is accommodated without the rigidity or resistance to compression of the intermediate members increasing too greatly with an increase in the range of wobbling movement of the shaft. Consequently, the shaft has a certain amount of float so that it may properly adjust itself about its centroidal axis.

While specific embodiments of the invention have been shown and described in detail to illustrate the application of the principles of the invention, it will be understood that the invention may be embodied otherwise without departing from such principles.

What is claimed is:

1. A rotatable shaft assembly comprising, in combination, a shaft; antifriction bearing means rotatably supporting and embracing said shaft, said bearing means including an inner race directly engaged with said shaft, an outer race, and antifriction elements disposed between and directly engaged with said inner race and said outer race; bearing housing means surrounding said bearing means and having an inner cylindrical surface spaced radially from the outer surface of said outer race; and a radially relatively narrow ring of elastic material disposed between and in direct engagement with said outer surface of said outer race and said inner surface of said bearing housing means; said ring having an axial width which is a minor fraction of the axial width of said outer race, and absorbing the radial loading on said shaft while providing for said shaft to tilt about its centroidal axis to compensate unbalanced dynamic loading.

2. A rotatable shaft assembly, as claimed in claim 1, in which one of said inner and outer surfaces is formed with an annular groove centered relative to said bearing means, said ring being seated in said groove and in direct engagement with the other of said inner and outer surfaces.

3. A rotatable shaft assembly, as claimed in claim 1, in which said ring has a substantially circular cross section.

4. A rotatable shaft assembly, as claimed in claim 3, in which one of said inner and outer surfaces is formed with an annular groove centered with respect to said bearing means and seating said ring.

5. A rotatable shaft assembly, as claimed in claim 4, in which said groove is formed in the inner surface of said bearing housing means.

6. A rotatable shaft assembly, as claimed in claim 1, in which said ring is located in a diametric plane through said bearing means and is centered radially of the latter.

7. A rotatable shaft assembly, as claimed in claim 1, including a second radially relatively narrow ring of elastic material disposed between and in direct engagement with the outer surface of said outer race and the inner surface of said bearing housing means; said second ring being spaced axially from said first ring and said two rings defining therebetween a damping chamber.

8. A rotatable shaft assembly, as claimed in claim 7, in which each of said rings has a substantially circular cross section.

9. A rotatable shaft assembly, as claimed in claim 7, in which there are a pair of annular grooves formed in one of said inner and outer surfaces and each seating a respective one of said rings.

10. A rotatable shaft assembly, as claimed in claim 9, in which said annular grooves are formed in the inner surface of said bearing housing means.

11. A rotatable shaft assembly comprising, in combination, a shaft; shaft bearing means rotatably supporting and embracing said shaft; bearing housing means surrounding said bearing means and having an inner surface spaced radially from the outer surface of said bearing means; a pair of axially spaced and axially relatively narrow rings of elastic material disposed between and in engagement with said inner and outer surfaces and defining therebetween a damping chamber; and means for maintaining oil under pressure in said damping chamber.

12. A rotatable shaft assembly comprising, in combination, a shaft; shaft bearing means rotatably supporting and embracing said shaft; bearing housing means surrounding said bearing means and having an inner surface spaced radially from the outer surface of said bearing means; and a pair of axially spaced and axially relatively narrow rings of elastic material disposed between and in engagement with said inner and outer surfaces and defining therebetween a damping chamber; said bearing housing means being formed with a passage communicating with said damping chamber for introduction and maintenance of oil under pressure in said damping chamber.

References Cited by the Examiner

UNITED STATES PATENTS 2,522,958  9/1950  Palmer _____ 74—573
2,937,613  5/1960  Larsh _____ 74—573

FRED C. MATTERN, Jr., *Primary Examiner.*

BROUGHTON G. DURHAM, *Examiner.*

W. S. RATLIFF, *Assistant Examiner.*